Figure 1:
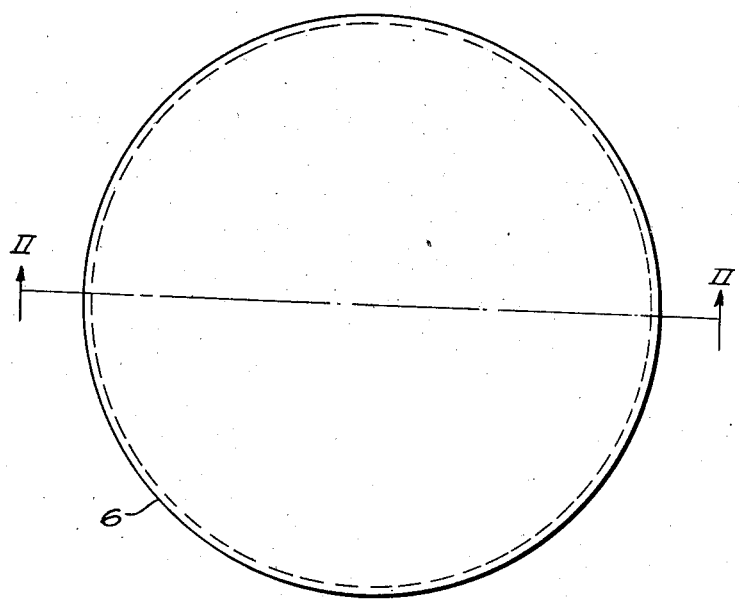

Aug. 19, 1941.    W. E. BERKEY    2,253,360
COATED LIGHTNING-ARRESTER BLOCK
Filed July 26, 1939

WITNESSES:
E. A. M?Closkey.
Nw. C. Gomee

INVENTOR
William E. Berkey.
BY O. D. Buchanan
ATTORNEY

Patented Aug. 19, 1941

2,253,360

UNITED STATES PATENT OFFICE 2,253,360

COATED LIGHTNING-ARRESTER BLOCK

William E. Berkey, Forest Hills, Pa., assignor to Westinghouse Electric & Manufacturing Company, East Pittsburgh, Pa., a corporation of Pennsylvania Application July 26, 1939, Serial No. 286,607

8 Claims. (Cl. 201—72)

My invention relates to blocks of high-resistance molded composition-material, which are utilized as excessive-voltage protective devices, because of their ability to readily discharge high currents at excessive voltages and to greatly increase their resistance to discharge at normal voltages. A preferred form of such blocks comprises silicon-carbide particles which are held together with a binder of water glass or clay, preferably the former, the blocks being made by mixing the silicon-carbide crystals and the binder with water, molding, and drying by means of baking or firing, firing being utilized for clay binders and baking for water-glass binders. Water glass is a commercial water-soluble sodium silicate, which may be defined as any one or more of a number of chemical compounds consisting of various proportions of silica, soda, and water. Other binders such as potassium silicate or other water-soluble silicates may also be used.

When blocks of the above-described class fail, a large percentage of the total number of failures take place over the lateral edge of the blocks, when insulating and protective coatings of the heretofore usual type are used. Such edge-failures appear to be due to loss of dielectric strength caused by excessive heating of the block as a result of previous operations.

It is an object of my invention, therefore, to provide a superior insulating and refractory coating for lightning-arrester blocks, so that the blocks do not flash over their lateral edges, even after excessive heating caused by many repeated operations.

In the case of previous lightning-arrester blocks, there have been also many failures resulting from what appear to be explosive effects within the interior of the blocks, causing particles and chunks to be blown off of the lateral edges of the blocks. When such breakage occurs, a discharge appears outside the insulation and flashover and failures are obtained. Heretofore, these lateral edges have been coated with an insulating finishing-paint or varnish, but such coating has not been able to provide any substantial resistance, or a sufficient resistance, to bursting. It has also been known, heretofore, to reimpregnate such blocks with water glass after the blocks have been once formed, but such treatment results in a deep penetration of the reimpregnating water glass into the pores of the block, changing the physical structure and the electrical characteristics of the block.

It is a further object of my present invention, therefore, to protect the lateral surfaces of high-resistance lightning-arrester blocks by means of a hard, tough encircling coating of an insulating material, or of a material which at least has a higher resistivity than the body-portion of the block, the thickness of said coating being sufficient to give the coating an adequate burst-resistant strength for protecting the lightning-arrester blocks and for preventing a certain percentage of the normally expectable number of failures of such blocks.

In order that my protective coating may be a coating, rather than an impregnating material which penetrates deep into the pores of the block, I necessarily mix a certain amount of inert filler-material with a binder, in preparing and applying said coating, and this constitutes an important part of my invention, in that the filler prevents the coating from penetrating too far into the pores of the arrester-block. Moreover the filler has refractory or heat-resistant properties and the dielectric strength of the new protective coating is greatly superior at higher temperatures.

Figure 2:
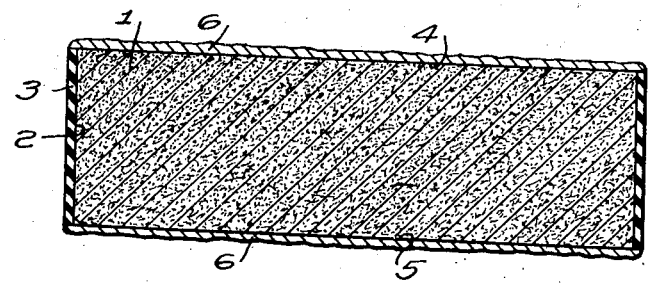

With the foregoing and other objects in view, my invention consists in the structures, combinations, and methods hereinafter described and claimed, and illustrated in connection with the accompanying drawing, wherein:

Figure 1 is a plan view of an arrester-block constructed in accordance with my invention; and Fig. 2 is a cross-sectional view thereof on the section-plane indicated by the line II—II in Fig. 1.

My invention is illustrated as being applied to a lightning-arrester block, the main body-portion of which is indicated at 1. By the term "block" I mean any conveniently shaped mass of material, the illustrated block being a short length of a cylindrically shaped mass, although I am obviously not limited to any particular length or shape. The illustrated block 1 is composed of silicon-carbide and commercial sodium silicate with a definite ratio of soda to silica. These ingredients are thoroughly mixed with water, molded, and dried by baking, so as to produce a high-resistance molded composition-block having the electrical characteristics previously described.

In accordance with my invention, the cylindrical lateral surfaces 2 of the block 1 are protected by a hard, tightly adhering coating 3, which is preferably painted or plastered on, to a thickness of some 5 or 10 mils, more or less, so as to provide requisite mechanical and dielectric strength, as will be subsequently described. As previously intimated, this coating 3 is composed of a binder and a filler. Outstandingly the best binder, which I have discovered, is water glass. The filler is preferably talc, but it may be any finely powdered refractory material or any finely subdivided mixture, either conductive or non-conductive, so long as the resistivity of the resultant coating 3 is at least of a higher order of magnitude than the resistivity of the block 1. In a preferred form of embodiment, I utilize nearly as much talc as sodium silicate, in preparing the coating-material 3 which is painted onto the sides of the block 1.

This coating-material is applied, as an aqueous mixture which must be of a high viscosity, the viscosity being comparable to that of doughy paste, or cake-frosting, something that will not run off of the block 1. The filler not only gives the coating the high viscosity, but also keeps the water glass from penetrating far into the pores of the lateral surface of the block 1. This coating is applied to the block 1 after the block has been molded and baked. The coated block is then subjected to a second drying operation, preferably by baking, to expel the moisture from the coating 3, converting the coating into the hard, tough, strongly cohering coating which is required in order to furnish mechanical support to the block 1, to protect it against the stress caused by electrical discharges within the block, and to increase the dielectric strength over the edges of the block so as to prevent flashover. Without the filler, the water glass, even with a very little water mixed with it, would soak into the block 1 so as to change the composition of the block for a considerable distance in from the edge. The filler is required, in order to give the coating a sufficient body, so that it will form a coating around the edge. Nevertheless, there is sufficient adherence to produce a sealing coating for preventing the internal discharges from getting out from around the sides of the block 1.

While talc is at present preferred by me, as the filler-material for the coating 3, I am not altogether limited thereto, and other suitable fillers may be used, such as, powdered aluminum oxide, zirconium oxide, powdered mica, powdered quartz, iron oxide, and other materials.

The block 1, with its lateral coating 3 as above described, is preferably finished by applying, to each of its flat end-surfaces 4 and 5, a sprayed-copper or other sprayed-metal coating 6, which preferably covers all of the end-surfaces of the block 1, extending all the way over to the edges where the block is coated by the coating 3. It is possible, however, for the sprayed-metal coatings 6 to stop just short of the peripheral edges of the end-surfaces 4 and 5 respectively of the block 1. These sprayed-metal coatings are preferably applied to the block after the lateral insulating, or extremely high-resistance, coating 3 is applied.

My invention results in reduction in the number of failures of lightning-arrester blocks, without deleteriously affecting the breakdown and cut-off voltages thereof. The breakdown voltage is the voltage at which the block begins to conduct discharges readily, on a rising-voltage wave; and the cut-off voltage is the voltage at which the block stops discharging current readily, on the declining portion of a voltage-surge or wave, the normal rated voltage of the block being below this cut-off voltage. By protecting the block against bursting, my invention also results in an increased current-carrying rating of the block, thus resulting in better performance.

While I have illustrated my invention in a single preferred form of embodiment, I wish it to be understood that I am not limited to this particular form, but that various changes may be made in structures, ingredients, and methods, as will be obvious to those skilled in the art, without departing from the essential broad principles of my invention. I desire, therefore, that the appended claims be accorded the broadest construction consistent with their language and the prior art.

I claim as my invention:

1. An excess-voltage protective device comprising a block of high-resistance molded composition-material adapted to carry current from end to end thereof and having a valve-type characteristic which enables it to readily discharge high currents at excessive voltages and to greatly increase its resistance to a discharge at normal voltages, and a hard coating adhering to the sides of the block and having an electrical resistivity of a higher order of magnitude than that of the block, said coating comprising a strongly cohering mixture including material proportions of a filler and a binder comprising a water-soluble silicate.

2. An excess-voltage protective device comprising a block of high-resistance molded composition-material adapted to carry current from end to end thereof and having a valve-type characteristic which enables it to readily discharge high currents at excessive voltages and to greatly increase its resistance to a discharge at normal voltages, and a hard coating adhering to the sides of the block and having an electrical resistivity of a higher order of magnitude than that of the block, said coating comprising a strongly cohering mixture including material proportions of talc and a binder comprising a water-soluble silicate.

3. An excess-voltage protective device comprising a block of high-resistance molded composition-material adapted to carry current from end to end thereof and having a valve-type characteristic which enables it to readily discharge high currents at excessive voltages and to greatly increase its resistance to a discharge at normal voltages, and a hard coating adhering to the sides of the block and having an electrical resistivity of a higher order of magnitude than that of the block, said coating comprising the product resulting from drying an aqueous mixture, initially having the consistency of doughy paste, and comprising a filler and a water-soluble silicate.

4. An excess-voltage protective device comprising a block of high-resistance molded composition-material adapted to carry current from end to end thereof and having a valve-type characteristic which enables it to readily discharge high currents at excessive voltages and to greatly increase its resistance to a discharge at normal voltages, and a hard coating adhering to the sides of the block and having an electrical resistivity of a higher order of magnitude than that of the block, said coating comprising the product resulting from drying an aqueous mixture, initially having the consistency of doughy paste, and comprising talc and a water-soluble silicate.

5. An excess-voltage protective device comprising an arrester proper adapted to carry current from end to end thereof and having a valve-type characteristic which enables it to readily discharge high currents at excessive voltages and to greatly increase its resistance to a discharge at normal voltages, and a hard, strong, thick coating adhering to the sides of the arrester proper and having an electrical resistivity of a higher order of magnitude than the arrester proper, said coating comprising a strongly cohering mixture including material proportions of a filler and a binder comprising a water-soluble silicate.

6. An excess-voltage protective device comprising an arrester proper adapted to carry current from end to end thereof and having a valve-type characteristic which enables it to readily discharge high currents at excessive voltages and to greatly increase its resistance to a discharge at normal voltages, and a hard, strong, thick coating adhering to the sides of the arrester proper and having an electrical resistivity of a higher order of magnitude than the arrester proper, said coating comprising a strongly cohering mixture including material proportions of talc and a binder comprising a water-soluble silicate.

7. An excess-voltage protective device comprising an arrester proper adapted to carry current from end to end thereof and having a valve-type characteristic which enables it to readily discharge high currents at excessive voltages and to greatly increase its resistance to a discharge at normal voltages, and a hard, strong, thick coating adhering to the sides of the arrester proper and having an electrical resistivity of a higher order of magnitude than the arrester proper, said coating comprising the product resulting from drying an aqueous mixture, initially having the consistency of doughy paste, and comprising a filler and a water-soluble silicate.

8. An excess-voltage protective device comprising an arrester proper adapted to carry current from end to end thereof and having a valve-type characteristic which enables it to readily discharge high currents at excessive voltages and to greatly increase its resistance to a discharge at normal voltages, and a hard, strong, thick coating adhering to the sides of the arrester proper and having an electrical resistivity of a higher order of magnitude than the arrester proper, said coating comprising the product resulting from drying an aqueous mixture, initially having the consistency of doughy paste, and comprising talc and a water-soluble silicate.

WILLIAM E. BERKEY.